US011577832B2

(12) United States Patent
Mugrauer

(10) Patent No.: US 11,577,832 B2
(45) Date of Patent: Feb. 14, 2023

(54) WING FOR USE IN A FLAPPING WING AIRCRAFT

(71) Applicant: Festo SE & Co. KG, Esslingen (DE)

(72) Inventor: Rainer Mugrauer, Schlaitdorf (DE)

(73) Assignee: Festo SE & Co. KG, Esslingen (DE)

( * ) Notice: Subject to any disclaimer, the term of this patent is extended or adjusted under 35 U.S.C. 154(b) by 4 days.

(21) Appl. No.: 17/306,391

(22) Filed: May 3, 2021

(65) Prior Publication Data

US 2021/0339856 A1 Nov. 4, 2021

(30) Foreign Application Priority Data

May 4, 2020 (DE) ..................... 10 2020 205 600.5

(51) Int. Cl.
*B64C 33/02* (2006.01)

(52) U.S. Cl.
CPC .................................. *B64C 33/025* (2013.01)

(58) Field of Classification Search
CPC .................................................... B64C 33/025
See application file for complete search history.

(56) References Cited

U.S. PATENT DOCUMENTS

| 1,428,559 | A | * | 9/1922 | Rilleau | B64C 33/02 244/123.1 |
| 1,845,913 | A | * | 2/1932 | Goodman | B64C 33/02 244/64 |
| 7,204,455 | B2 | * | 4/2007 | Sinclair | A63H 27/008 244/72 |
| 2001/0019088 | A1 | * | 9/2001 | Smith | B64C 33/02 244/17.13 |
| 2003/0226933 | A1 | * | 12/2003 | Richard | B64C 33/00 244/11 |
| 2004/0155145 | A1 | * | 8/2004 | Ohta | B64C 33/02 244/72 |
| 2007/0205322 | A1 | * | 9/2007 | Liao | B64C 39/028 244/22 |
| 2007/0210207 | A1 | * | 9/2007 | Liao | B64C 33/02 244/22 |
| 2008/0251632 | A1 | * | 10/2008 | Kim | B64C 33/02 244/22 |
| 2010/0308160 | A1 | * | 12/2010 | Keennon | B64C 33/02 244/22 |

FOREIGN PATENT DOCUMENTS

| DE | 315493 | 11/1919 | |
| DE | 102011013704 A1 * | 9/2012 | ............. B64C 33/02 |
| DE | 102011013704 A1 | 9/2012 | |
| GB | 270926 | 5/1927 | |
| GB | 289829 | 10/1928 | |
| GB | 885273 | 12/1961 | |
| WO | 2008128780 A1 | 10/2008 | |

* cited by examiner

*Primary Examiner* — Justin M Benedik
(74) *Attorney, Agent, or Firm* — Hoffmann & Baron, LLP

(57) ABSTRACT

A wing for use in a flapping wing aircraft, having a strut assembly including a main strut and a plurality of support struts each oriented at an angular interval between 30 degrees and 90 degrees with respect to the support strut, at least a section of the support struts having a front section, a connecting section adjacent thereto, and a rear section adjacent thereto, and wherein each of said support struts is secured to said main strut by said connecting section, and further having a group of planking members made of a resilient and dimensionally stable sheet material and connected to said strut assembly.

7 Claims, 2 Drawing Sheets

WING FOR USE IN A FLAPPING WING AIRCRAFT

BACKGROUND OF THE INVENTION

The invention relates to a wing for use in a flapping wing aircraft.

From GB 885,273, an ornithopter with movable wings is known, each of the wings having a rigid front portion of wing cross-section and a flexible rear portion movable upwardly or downwardly relative to the front rigid portion when the wing is moved upwardly or downwardly, the portion tapering outwardly so that its surface area is greatest at the inner end of the wing and the surface area of the portion is greatest at the outer end of the wing. The rear part consists of a number of overlapping flap sections with rigid spars connected to the front part and arranged so that air is trapped under the wing when the wing is moved downward, but so that air can pass through the wing from top to bottom when the wing is moved upward.

SUMMARY OF THE INVENTION

The object of the invention is to provide a wing having improved aerodynamic efficiency.

This task is solved for a wing as mentioned above having the following features:

The wing comprises a strut arrangement which comprises a main strut and a plurality of supporting struts each aligned at an angular interval between 30 degrees and 90 degrees with respect to the main strut. At least a part of the supporting struts having a front section, a connecting section adjacent thereto and a rear section adjacent thereto. Each of these supporting struts is fixed to the main strut by means of the connecting section. The wing furthermore comprising a group of planking members which are made of an elastic and dimensionally stable foil material and which are connected to the strut arrangement.

The advantageous operation of the wing is based on the fact that the support struts are formed for a continuous flow of force or homogenous force distribution between the front section, the connecting section and the rear section, and that the main strut is used in the manner of a pivot bearing for the respective support struts. During the intended use of the wing, relative movements of the rear section with respect to the main strut occurring due to aerodynamic forces result in corresponding relative movements of the front section with respect to the main strut.

It can be provided that the support struts are made of a fiber-reinforced plastic material in order to achieve an advantageous compromise in terms of weight and stability. By way of example, the fibers provided for reinforcement of the support struts are from the group: natural fibers, glass fibers, Kevlar fibers, carbon fibers or a fiber mixture thereof. These fibers may be provided in the form of a woven, knitted, nonwoven or knitted fabric, which is formed into the respective support strut using a curable binder material, in particular synthetic resin.

Exemplarily, the support strut is a carbon fiber-reinforced round bar with a circular cross-section, which is deformed exclusively elastically by the action of aerodynamic forces when the wing is used as intended. Preferably, it is provided that the support strut is deformed, at least in sections, to near the limit between elastic and plastic deformation during intended use of the wing in a flapping wing aircraft. This results in an advantageous deformation of the wing during an upstroke and downstroke motion, which has a close resemblance to the flapping of a bird's wing.

In this regard, it is of particular importance that the support strut is fixed to the main strut by means of the connecting section, the main strut being oriented at least substantially transversely to the flight direction of the flapping wing aircraft equipped with the wing when the wing is used as intended. Accordingly, the upstroke and downstroke movements of the wing result in force effects acting on the support struts substantially in the vertical direction, due to the aerodynamic forces occurring in the process. Due to aerodynamic forces the respective support strut applies a torque to the main strut. The torque which is applied by the support strut to the main strut results from a difference between a torque which is applied from the front section to the main strut and a torque which applied from the rear section to the main strut. In practice a rocking movement of the respective front sections relative to the respective rear section takes place, with the main strut forming the rocking axis.

The task of the planking members is to ensure the displacement of air required to generate lift and/or propulsion during a movement of the wing by a suitably designed propulsion device of a flapping wing aircraft. The planking members are designed in different geometric configurations and are connected to the strut arrangement in such a way that, for example, the smallest possible displacement of air takes place during an upstroke movement of the wing, while the largest possible displacement of air takes place during a downstroke movement of the wing, in particular in the vertical downward direction to ensure lift. The planking members are made of a foil material which is selected with respect to its thickness and its elasticity in such a way that, on the one hand, it can perform an evasive movement by elastic deformation during the upstroke movement in order to allow the desired small displacement of air and, on the other hand, it ensures the desired displacement of air during the downstroke movement by means of the provided support on the strut arrangement.

Advantageous further embodiments of the invention are the subject of the subclaims.

It is expedient if the main strut is extended along a straight line and/or that at least one of the support struts is extended along a straight line. If straight-line support struts and/or a straight-line main strut are used, low-cost semi-finished products such as round rods made of fiber-reinforced plastic can be used, which makes it possible to manufacture the strut arrangement at low cost. Furthermore, rectilinear support struts or a rectilinear main strut of rectilinear design allow(s) the use of standard components, which also leads to favourable manufacturing costs. In addition, a deformation behaviour for a wing with such support struts or a main strut of such a design can be simulated in a favourable manner.

Preferably, it is provided that an end region of the front section spaced from the connecting section is connected to an arcuately formed edge strut which extends between the end regions of maximally spaced support struts of the strut arrangement. The purpose of the edge strut, in conjunction with the leading sections of the support struts, is to provide a stable wing leading edge for the wing in order to be able to ensure an advantageous air flow of the wing when used in a flapping wing aircraft and thus also a high aerodynamic efficiency for the wing.

According to a further embodiment of the invention, it is provided that a length of the rear section of the support strut is at least 2 times, preferably at least 3 times, a maximum distance between the main strut and the edge strut. Such a design of the support strut ensures that deformations of the wing, as may occur during the intended use of the wing for a flapping wing aircraft, occur substantially at the rear part of the wing determined by the rear sections, whereas the front part of the wing determined by the front sections and the edge strut experiences a significantly smaller deformation.

According to a further embodiment of the invention, it is provided that the connecting sections are connected in a rotationally fixed manner to the main strut, which is in particular of torsionally elastic design. Due to the rotationally fixed coupling of the connecting sections to the main strut, an excessive rocking movement for the supporting struts during the intended use of the wing is avoided, as could occur, for example, if the connecting sections were rotationally coupled to the main strut. In order to ensure the desired interaction between a deflection of the rear section and a deflection of the front section corresponding thereto, it can be provided that the main strut is dimensioned in such a way that, during intended use of the wing, it undergoes an elastic torsional deformation due to a resulting torque, which results from the torques introduced by the respective rear section and by the respective front section. This torsional deformation of the main strut permits a pivoting movement of the respective support strut about the main strut, with which advantageous aerodynamic behaviour of the wing is ensured.

It is advantageous if adjacently arranged support struts delimit an angle between 0 degrees and 25 degrees with each other. This ensures an advantageous distribution of the support struts over an overall area of the strut arrangement.

According to a further embodiment of the invention a front surface area spanning the front sections of the support struts starting from the main strut is provided with a front planking member belonging to the group of planking members, which front planking member is fixed to the main strut and to the front sections. The front planking member is intended to be in contact with the strut arrangement at all times, irrespective of a state of movement of the wing, in order to thereby always ensure an advantageous air flow to the areas of the wing formed by the rear sections and the associated planking members.

It is preferably provided that, starting from the main strut between adjacently arranged rear sections, a rear planking member belonging to the group of planking members is extended along the rear section of one of the supporting struts, which is fixed to the rear section by means of a fixing region and which covers, by means of a free end region, the rear section of the adjacent supporting strut or a projection fixed to the rear section of the adjacent supporting strut and belonging to a further rear planking member. The purpose of the rear planking member is to implement variable air resistance as a function of a state of movement of the wing. In this way, it can be achieved that the wing displaces a smaller amount of air during an upstroke movement due to a lower air resistance than during a downstroke movement, in which the wing can displace a larger amount of air due to a higher air resistance. These effects are based on the elastic deformation of the planking members during the upstroke movement and on the mechanical support of adjacent planking members during the downstroke movement. For this purpose, the rear planking member is designed with a geometry that resembles a bird's feather. The quill of the bird feather is simulated by the support strut, which, however, deviates from a typical bird feather due to the connection with the edge strut.

BRIEF DESCRIPTION OF THE DRAWINGS

The invention is explained in more detail below with reference to the accompanying drawing. Here shows.

DETAILED DESCRIPTION

Figure 1:
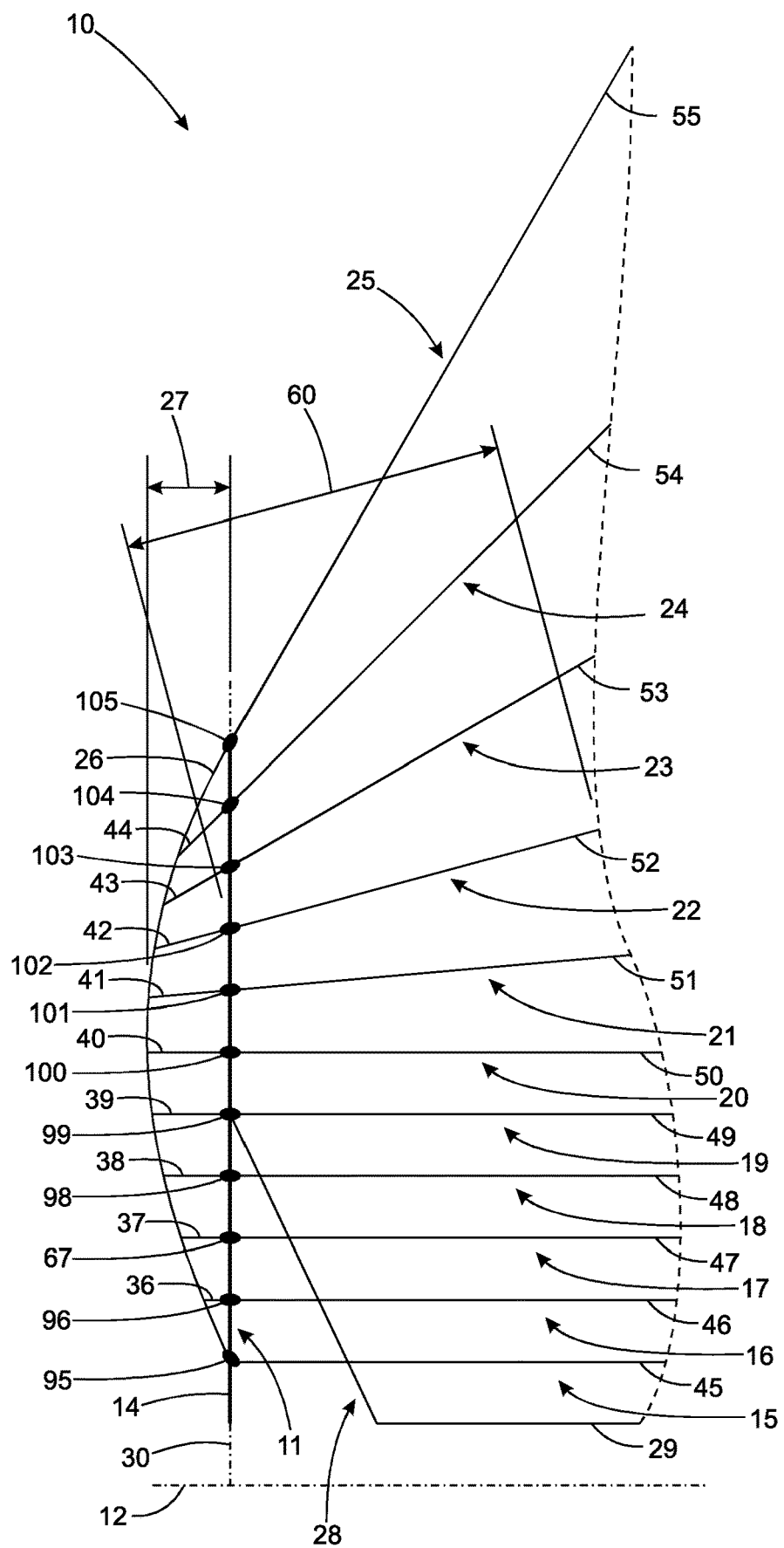
FIG. 1 a top view of a strut arrangement of a wing, and
FIG. 2 a top view of a wing comprising the strut assembly shown in FIG. 1 and planking members.
Figure 2:
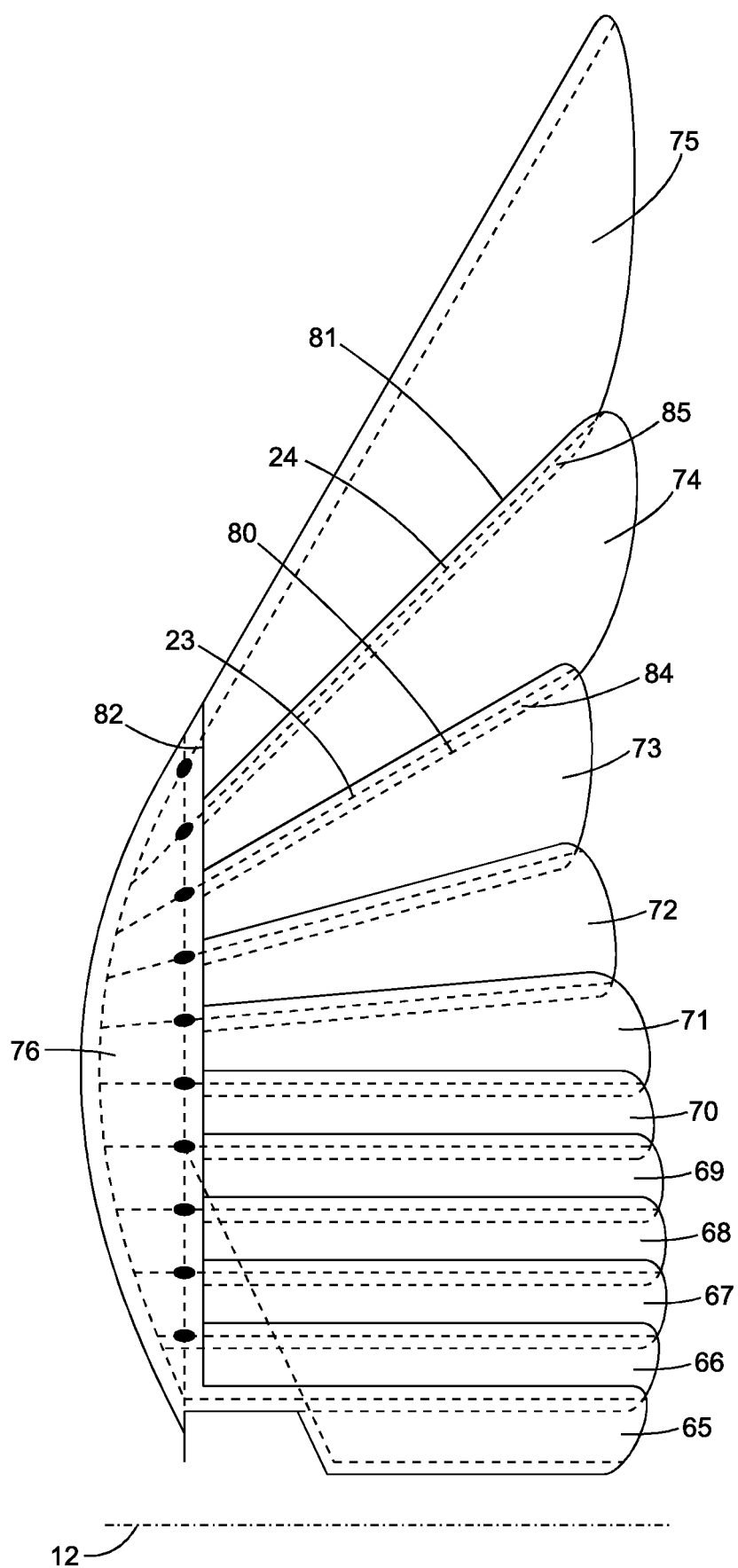

A strut arrangement 10 as shown in FIG. 1 serves as a support structure for a wing 1 shown in FIG. 2, which wing 1 is designed for use with a flapping wing aircraft (not shown), in particular with an ornithopter.

In the strut arrangement 10 according to FIG. 1, it is provided that a main strut 11 is aligned transversely to a pivot axis 12, wherein the pivot axis 12 can be, for example, a pivot axis of a coupling device as described in document DE 10 2013 004 188 A1.

The strut arrangement 10 comprises a total of eleven support struts 15 to 25, which are exemplarily aligned in an angular interval of 45 degrees to 90 degrees relative to the main strut 11. For the following description of the strut arrangement 10 as well as the wing 1 shown in FIG. 2, it is assumed that the main strut 11 as well as the supporting struts 15 to 25 are aligned parallel to the plane of representation of FIGS. 1 and 2. When the wing 1 is used as intended, an elastic deformation of the individual support struts 15 to 25 can occur due to the action of flow forces which can be caused by oscillating pivoting movements of the wing 1 about the pivot axis 12 in an air atmosphere, which can result in a curvature of the respective support strut 15 to 25.

The support struts 16 to 24 each have a front section 36 to 44, which extends to the left of the main strut 11 as shown in FIGS. 1 and 2. Further, each of the support struts 15 to 25 has a rear section 45 to 55 extending to the right of the main strut 11 according to the illustrations of FIGS. 1 and 2. Further, each of the support struts 15 to 25 is non-rotatably connected to the main strut 11 by a connecting section 65 to 75.

It is further provided that, adjacent to the rear section 55, the support strut 25 merges with an arcuately curved edge strut 26 which extends to the connecting section 65 of the support strut 15. End regions of the support struts 16 to 24 facing away from the respective rear sections 46 to 54 are connected to the edge strut 26.

By way of example, it is provided that a minimum length 60 of the support struts 15 to 25 corresponds to a multiple of a maximum distance 27 between the main strut 11 and the edge strut 26.

Furthermore it is provided that the support struts 15 to 20 are aligned parallel to each other, while the support struts 21 to 25 are each aligned at an acute angle to each other.

As can be seen from FIGS. 1 and 2, the main strut 11 and the supporting struts 15 to 25 are each of rectilinear design and can therefore be manufactured in a simple manner from round rods, for example from fiber-reinforced plastic rods.

By way of example, it is provided that a free end region 14 of the main strut 11 is designed for coupling to a joint part of the aforementioned coupling device (not shown). For a stable connection of the wing to the joint part a coupling strut 28 is additionally provided, which is aligned at an acute angle to the main strut 11 and is connected at the end to the main strut 11 and to an edge strut 29 respectively.

As can be further seen from FIGS. 1 and 2, a cross-section of the main strut 11 is selected to be larger than a cross-section of the supporting struts 15 to 25 as well as of the coupling strut 28 and the edge strut 29. This ensures that the forces occurring during a pivoting movement of the wing 1 about the pivot axis 12, which are introduced via the main strut 11, do not lead to an undesirable bending deformation of the main strut 11. Preferably, a profiling of the main strut 11, which is not shown in more detail, is circular in a cross-sectional plane (not shown), which is aligned transversely to a longitudinal axis 30 of the main strut 11. With suitable material selection and dimensioning of the main strut 11, this allows a torsional elasticity for the support strut 11 that allows a certain pivoting movement of the individual support struts 15 to 25 when performing pivoting movements about the pivot axis 12.

Due to the one-piece design of the support struts 16 to 24 and the design of the length ratios for the front sections 36 to 44 and the associated rear sections 46 to 54 of the support struts 16 to 24, it can be achieved in connection with the torsional elasticity of the main strut 11 that the forces acting on the rear sections 46 to 54 during a downstroke movement of the wing 1 on the one hand lead to an elastic deformation of the respective rear sections 46 to 54 and on the other hand result in a torque introduction onto the support strut 11. As a result of this torque introduction, the main strut 11 performs a torsion movement about its longitudinal axis 30, causing a change in the spatial orientation of the front sections 36 to 44 and the edge strut 26 connected thereto. Thus, with appropriate tuning of the elastic deformation behaviour for the rear sections 46 through 54 and the torsional elasticity of the main strut 11, an advantageous overall deformation can be obtained for the wing 1 when used in a flapping wing aircraft.

In the embodiment of FIG. 2, a complete wing 1 is shown which, in addition to the strut arrangement 10 shown in FIG. 1, includes planking members 65 to 76 which are made of an elastic and dimensionally stable sheet material and which are connected to the strut assembly 10. In the illustration of FIG. 2, the planking members 65 to 75 are shown in an undeformed state, which they assume, for example, in a resting state of the wing 1. In this case, the planking members 65 to 75 are at least essentially flat.

Preferably, at least the planking members 65 to 75, which are also referred to as rear planking members, are made of a plastic material which, on the one hand, has sufficient elasticity when the wing 1 is used as intended in order to ensure that air can pass through the wing 1 during an upstroke movement of the wing 1 by elastic deformation of the individual planking members 65 to 75. On the other hand, the plastic material of the planking members 65 to 75 should also be sufficiently dimensionally stable to allow maximum displacement of air during a downstroke movement of the wing 1, with air accordingly being prevented from passing through the wing 1 during the downstroke movement.

By way of example, the attachment of the planking members 65 to 75 is explained with reference to the planking member 74, the following description also being at least substantially valid for the other planking members 65 to 73 and 75.

As can be seen from the illustration in FIG. 2, the planking member 74 covers an area extending between the support strut 23 and the support strut 24. In this regard, the planking member 74 is cut, purely by way of example, in such a way that it has an outer edge 80 aligned parallel to the support strut 24 and spaced from the support strut 24 and that it has an inner edge 81 aligned parallel to the support strut 23 and spaced from the support strut 23. Further, the planking member 74 has a leading edge 82 aligned parallel to the main strut 11, the leading edge 82 being disposed in the region of the rear section 54 and not in the region of the front section 44 adjacent the support strut 11. A rear edge 83 of the planking member 74 is rounded in shape and extends between the support strut 24 and the support strut 23.

The planking member 74 is connected to the support strut 24 in a manner not shown in greater detail, for example by bonding. An inner edge 80 of the planking member 74 is arranged parallel and adjacent to the support strut 23, whereby there is a strip-shaped projection 84 of the planking member 74 in the direction of the inwardly adjacent support strut 23. An outer edge 81 of the planking member 74 is oriented parallel and adjacent to the support strut 24, whereby there is an overhang 84 of the planking member 74 in the direction of the outwardly adjacent support strut 25.

The planking members 65 to 75 are arranged overlapping one another in the manner of roof shingles, wherein, when viewed from an upper side of the wing 1, the respective planking member 65 to 74 lying further inwards, i.e. arranged closer to the pivot axis 12, is arranged above the respective adjacent planking member 66 to 75 lying further outwards.

During a dynamic movement of the wing 1, which can be described as a sequence of an upstroke movement of the wing 1 about the pivot axis 12 and a downstroke movement for the wing 1 in the opposite direction about the pivot axis, elastic deformation of the planking members 65 to 75 occurs during the upstroke movement, during which the respective projection, exemplarily the projection 84, moves away downwards from the respective nearest support strut, exemplarily the support strut 23.

This elastic deformation, which manifests itself as a bending of the planking member 74 during the upstroke movement, is intended to ensure the least possible air displacement, which applies in the same way to the other planking members 65 to 73 and 75.

During the subsequent downstroke movement, on the other hand, the planking member 74 is to bear as tightly as possible against the adjacent planking member 73, for which purpose the projection 84 serves, which bears against the underside of the planking member 73 in the region of the support strut 23. This ensures that the planking member 84 achieves the greatest possible air displacement during the downstroke movement, which also applies in the same way to the other planking members 65 to 73 and 75.

The front sections 36 to 44 are covered by a front planking member 76 which is connected, in particular glued, to all front sections 36 to 44 and which does not undergo any appreciable elastic deformation during the up and down movements of the wing.

What is claimed is:

1. A wing for use in a flapping wing aircraft, comprising a strut assembly including a main strut and a plurality of support struts each oriented within an angular interval between 30 degrees and 90 degrees with respect to the main strut, wherein at least one support strut has a front section, a connecting section adjacent thereto, and a rear section adjacent thereto and wherein the connecting section is fixed to the main strut, and further comprising a group of planking members which are made of an elastic and dimensionally stable foil material and which are connected to the strut assembly, and wherein the connecting sections are connected in a rotationally fixed manner to the main strut.

2. The wing according to claim 1, wherein the main strut is extended along a straight line and/or wherein at least one of the supporting struts is extended along a straight line.

3. The wing according to claim 1, wherein an end region of the front section spaced apart from the connecting section is connected to an arcuately formed edge strut which extends between the end regions of maximally spaced-apart support struts of the strut arrangement.

4. The wing according to claim 1, wherein a length of the rear section of the support strut is at least 2 times of a maximum distance between the main strut and the edge strut.

5. The wing according to claim 1, wherein adjacently arranged support struts delimit an angle between 0 degrees and 25 degrees with one another.

6. The wing according to claim 1, wherein a front surface area which, starting from the main strut, spans the front sections of the supporting struts is provided with a front planking member belonging to the group of planking members, which is fixed to the main strut and to the front sections.

7. The wing according to claim 1, wherein a rear planking member extends from the main strut along the rear section of one of the supporting struts, which rear planking member is fixed with an attachment region to the rear section of the supporting strut, wherein a free end region of the rear planking member covers a rear section of an adjacent support strut or covers a projection of another rear planking member which is fixed to a rear section of an adjacent support strut.

\* \* \* \* \*